United States Patent
Ono et al.

(10) Patent No.: US 10,990,604 B2
(45) Date of Patent: Apr. 27, 2021

(54) NON-TRANSITORY COMPUTER-READABLE STORAGE MEDIUM, RECORD DATA PROCESSING METHOD, AND RECORD DATA PROCESSING APPARATUS

(71) Applicant: FUJITSU LIMITED, Kawasaki (JP)

(72) Inventors: Toshiro Ono, Nishinomiya (JP); Masaki Nishigaki, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 15/892,845

(22) Filed: Feb. 9, 2018

(65) Prior Publication Data
US 2018/0232353 A1 Aug. 16, 2018

(30) Foreign Application Priority Data
Feb. 15, 2017 (JP) .............................. JP2017-026165

(51) Int. Cl.
*G06F 16/25* (2019.01)
*G06F 16/11* (2019.01)

(52) U.S. Cl.
CPC .......... *G06F 16/258* (2019.01); *G06F 16/116* (2019.01); *G06F 16/254* (2019.01)

(58) Field of Classification Search
CPC .... G06F 16/116; G06F 16/258; G06F 16/254; G06F 11/3068; G06F 17/2705; G06F 9/52
USPC ................................................. 707/756, 755
See application file for complete search history.

(56) References Cited

U.S. PATENT DOCUMENTS

| | | | | |
|---|---|---|---|---|
| 6,636,861 B1 * | 10/2003 | Stack | ..................... | G06F 16/258 |
| 7,185,232 B1 * | 2/2007 | Leavy | ..................... | H04L 43/50 |
| | | | | 714/41 |
| 7,512,610 B1 * | 3/2009 | Barabas | ................... | G06F 16/10 |
| 8,065,267 B2 * | 11/2011 | Noda | .................... | G06F 40/174 |
| | | | | 707/609 |
| 10,248,720 B1 * | 4/2019 | Wesley | ................... | G06F 16/34 |
| 2006/0168515 A1 * | 7/2006 | Dorsett, Jr. | ........... | G06F 40/154 |
| | | | | 715/255 |
| 2007/0260571 A1 * | 11/2007 | Mansfield | ............. | G06F 40/154 |
| | | | | 706/48 |

(Continued)

FOREIGN PATENT DOCUMENTS

JP 2009-116395 A 5/2009
JP 2015-170170 A 9/2015

*Primary Examiner* — Dennis Truong
(74) *Attorney, Agent, or Firm* — Fujitsu Patent Center

(57) ABSTRACT

A non-transitory computer-readable storage medium storing a program that causes a computer to execute a processing, the processing including identifying, by a plurality of processes, at least one candidate for a record separation point from text data in each of a plurality of divided files, detecting, from the text data in the plurality of divided files, a text region indicating one data value based on a detection result of predetermined format code, determining that the at least one candidate that is not included in the text region is a record separation point, and transmitting a plurality of partial texts corresponding to the pieces of record data to one or more processes that transforms the plurality of partial text into a record format data, each of the plurality of partial texts being extracted from the plurality of divided files based on the determined record separation point.

8 Claims, 14 Drawing Sheets

| BLOCK No. | CASE WHERE ENCLOSURE STATE OF RANGE START POINT IS OFF | | CASE WHERE ENCLOSURE STATE OF RANGE START POINT IS ON | |
|---|---|---|---|---|
| | RANGE-END ENCLOSURE STATE (a1) | RANGE-END ENCLOSURE STATE (b1) | RANGE-END ENCLOSURE STATE (a2) | RANGE-END ENCLOSURE STATE (b2) |
| 2 | ON | 19885 (byte) | OFF | 19225 (byte) |

| BLOCK No | RANGE-END ENCLOSURE STATE (A) | RANGE-END ENCLOSURE STATE (B) |
|---|---|---|
| 1 | ON | 9984 (byte) |
| 2 | OFF | 19225 (byte) |
| UNENTERED | UNENTERED | UNENTERED |

171, 172, 173

(56) References Cited

U.S. PATENT DOCUMENTS

| | | | | |
|---|---|---|---|---|
| 2014/0114908 A1* | 4/2014 | Henrichs | ............... | G06F 19/32 |
| | | | | 707/602 |
| 2014/0114929 A1* | 4/2014 | Henrichs | ............... | G06F 16/258 |
| | | | | 707/687 |
| 2014/0258341 A1* | 9/2014 | Mazoue | ............... | G06F 16/211 |
| | | | | 707/803 |
| 2015/0254287 A1* | 9/2015 | Tateiwa | ............... | G06F 16/182 |
| | | | | 707/755 |
| 2015/0310087 A1* | 10/2015 | Tidwell | ............... | G06F 16/258 |
| | | | | 713/189 |
| 2016/0103887 A1* | 4/2016 | Fletcher | ............... | G06F 16/334 |
| | | | | 707/722 |
| 2019/0079984 A1* | 3/2019 | Lancaster | ............ | G06F 16/285 |

* cited by examiner

FIG. 4

| BLOCK No. (171) | RANGE-END ENCLOSURE STATE (A) (172) | EXTENDING-RECORD START POSITION (B) (173) |
|---|---|---|
| 1 | ON | 9984 (byte) |
| 2 | OFF | 19225 (byte) |
| UNENTERED | UNENTERED | UNENTERED |

FIG. 6

| BLOCK No. | CASE WHERE ENCLOSURE STATE OF RANGE START POINT IS OFF | | CASE WHERE ENCLOSURE STATE OF RANGE START POINT IS ON | |
|---|---|---|---|---|
| | RANGE-END ENCLOSURE STATE (a1) | RANGE-END ENCLOSURE STATE (b1) | RANGE-END ENCLOSURE STATE (a2) | RANGE-END ENCLOSURE STATE (b2) |
| 2 | ON | 19885 (byte) | OFF | 19225 (byte) |

| BLOCK No (171) | RANGE-END ENCLOSURE STATE (A) (172) | RANGE-END ENCLOSURE STATE (B) (173) |
|---|---|---|
| 1 | ON | 9984 (byte) |
| 2 | OFF | 19225 (byte) |
| UNENTERED | UNENTERED | UNENTERED |

NON-TRANSITORY COMPUTER-READABLE STORAGE MEDIUM, RECORD DATA PROCESSING METHOD, AND RECORD DATA PROCESSING APPARATUS

CROSS-REFERENCE TO RELATED APPLICATION

This application is based upon and claims the benefit of priority of the prior Japanese Patent Application No. 2017-26165, filed on Feb. 15, 2017, the entire contents of which are incorporated herein by reference.

FIELD

The embodiments discussed herein are related to a non-transitory computer-readable storage medium, a record data processing method, and a record data processing apparatus.

BACKGROUND

To date, database management systems (DBMSs) have been used. In such a DBMS, a piece of relevant data is found from among pieces of data stored in the DBMS and undergoes an arithmetic operation designated by a user. To store data, the DBMS implements a data loading function (hereinafter, simply referred to as a loader in some cases) that extracts data from a file transmitted from a different system and that stores the data in the DBMS. The loader collectively moves the data in the file from the different system. Accordingly, sequential input-output processing, pipeline processing, simultaneous execution processing, parallel processing, and the like are used, and thereby a processing speed is increased.

In computer resources in the related art, parallel file reading using parallel processing is performed after a file is divided in accordance with operation designing by the user. In contrast, in currently used computer resources, a large file in one unit volume is transferred and stored in the DBMS at once because the number of cores and a space of a memory (a random access memory (RAM)) are increased compared with those in the computer resources in the related art. As described above, the currently used computer resources enable a transferred file to be stored in the RAM that is a file cache, and thus the bottleneck caused by random access is reduced.

Accordingly, in recent years, data is input from a file in parallel without dividing the file by the user. Specifically, a currently used computer divides one file to be transferred and stored in the RAM in processing units with any degree of parallelism and then reads the data.

The following documents are examples of the related art:
Japanese Laid-open Patent Publication No. 2009-116395; and
Japanese Laid-open Patent Publication No. 2015-170170.

SUMMARY

According to an aspect of the invention, a non-transitory computer-readable storage medium storing a program that causes a computer to execute a processing, the processing including identifying, by a plurality of processes, at least one candidate for a record separation point from text data in each of a plurality of divided files, the plurality of divided files being generated by dividing a text file corresponding to pieces of record data delimited by a delimiter, detecting, from the text data in the plurality of divided files, a text region indicating one data value based on a detection result of predetermined format code, determining that the at least one candidate that is not included in the text region is a record separation point, and transmitting a plurality of partial texts corresponding to the pieces of record data to one or more processes that transforms the plurality of partial text into a record format data, each of the plurality of partial texts being extracted from the plurality of divided files based on the determined record separation point.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a table illustrating example information stored in a block-shared information database (DB);

FIG. 6 is a diagram explaining an example of updating block-shared information;

DESCRIPTION OF EMBODIMENTS

Figure 1:
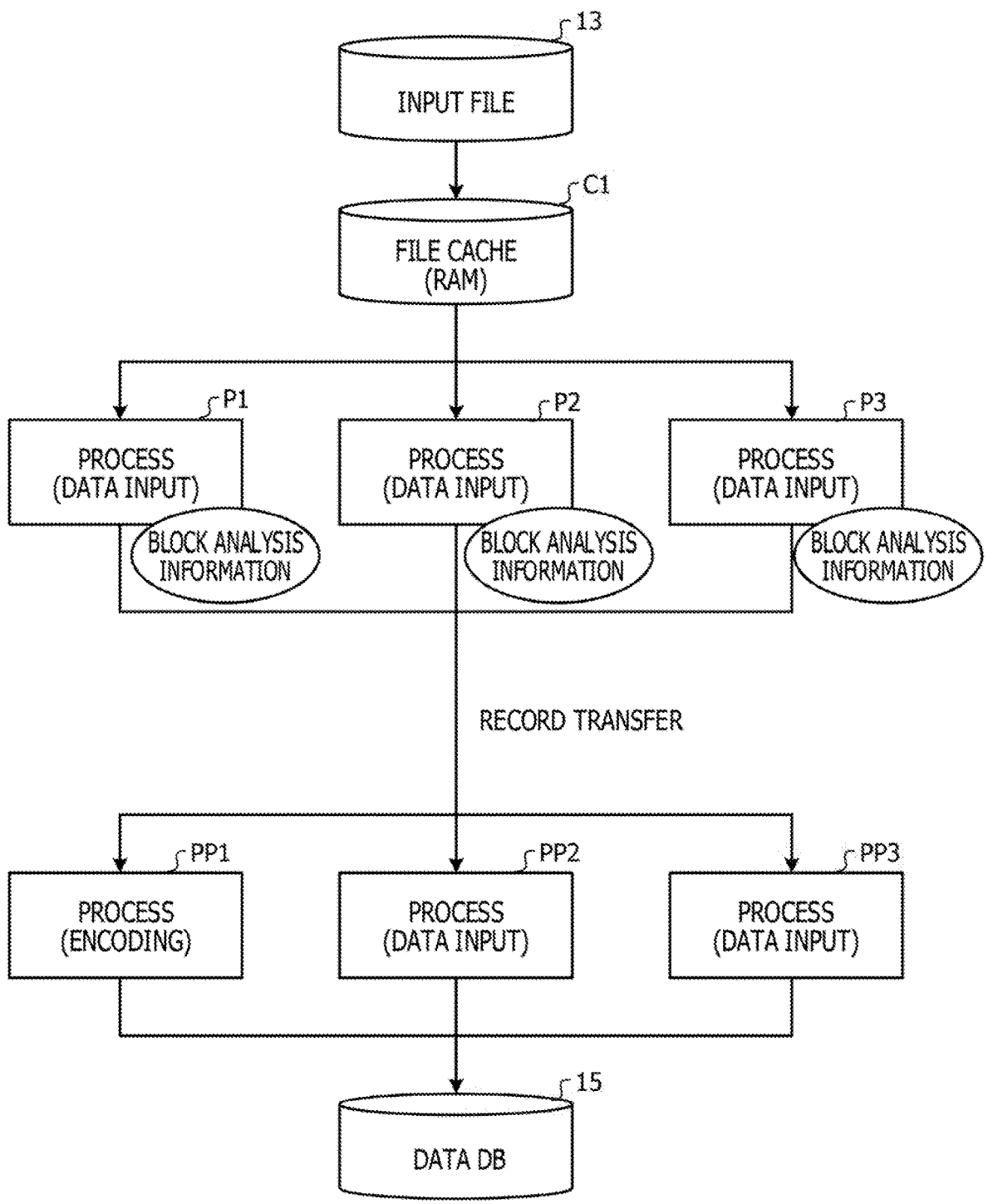
FIG. 1 is a diagram explaining a reading process according to Embodiment 1.

Although parallel processing is performed in recent years, the parallel processing performed when a text file delimited using delimiters including an extended format code is read leads to deterioration of processing performance.

Typically, an input file is loaded for data correspondence between systems and thus has a CSV format in many cases. In the CSV format, entries are delimited by using delimiter characters such as a comma, and the end of each row is denoted by a line feed code. To read the CSV file in the parallel processing, recognition of the delimiter characters is determined, and thereafter the parallel processing is performed. Accordingly, the processing performance becomes a bottleneck due to the recognition of the delimiter characters.

In one aspect, an object of the embodiments is to provide a read program, a reading method, and an information processing apparatus that enable a text file delimited by using a delimiter including an extended format code to be read in parallel processing.

Hereinafter, embodiments of a read program, a reading method, and an information processing apparatus that are disclosed in the present application will be described in detail with reference to the drawings. Note that an embodiment is not limited by the disclosed embodiments. Any of the embodiments may be appropriately combined with each other as long as the combination is consistent.

Embodiment 1

Explanation of Reading Process According to Embodiment 1

An information processing apparatus 10 according to Embodiment 1 includes a plurality of central processing units (CPUs) and is an example of a server apparatus that performs parallel processing. For example, the information processing apparatus 10 includes 48 or more CPUs, a non-volatile memory disc appropriate for random accesses performed by using a 256-GB RAM, and the like as computer resources.

The information processing apparatus 10 as described above executes processes in parallel by using the plurality of CPUs. In each process, a file input from a different system is stored in the RAM and then transferred to a DB. Specifically, the information processing apparatus 10 executes data input processes in parallel, executes encoding processes in parallel, executes table generation processes in parallel, executes index generation processes in parallel, and writes the file to the DB (DBMS).

For example, each data input process is a process in which data is taken from the file in a unit corresponding to a DBMS record. Each encoding process is a process in which the format of the data is changed to a DBMS record format. Each index generation process is a process in which indexes of records in a table are generated and conversion to an index record format (a key and a pointer to a table area), sorting index records by key, generation of an index structure, writing to the index area, and the like are performed.

When executing the data input process, the information processing apparatus 10 identifies the separation points of records in analysis in first-round parallel reading, extracts the records based on this information in second-round parallel reading, and transfers the records to the encoding process.

Here, a reading process according to Embodiment 1 is described. FIG. 1 is a diagram explaining a reading process according to Embodiment 1. As illustrated in FIG. 1, the information processing apparatus 10 stores an input file 13 in a file cache (RAM) CL. Note that the input file 13 has a CSV format frequently used for data correspondence between systems. Specifically, the input file 13 is a text file delimited by using delimiters, in other words, a file generated in such a manner that entries are delimited by using delimiter characters such as a comma and the end of each row is denoted by a line feed code.

The information processing apparatus 10 then performs parallel processing of processes P1, P2, and P3 that are each a process for inputting data. Specifically, in each of the processes P1 to P3, candidates for record separation points are identified for each of a plurality of files (hereinafter, referred to as divided files) resulting from division of the text file delimited by using the delimiters. The candidates are identified for each of cases where an extended format code is respectively active and inactive.

Subsequently, in each of the processes P1 to P3, when a text file that is a divided file assigned to a corresponding one of the processes P1 to P3 is read in an order according to an order from a top portion of the text file, whether a state of the extended format code is active or inactive in the divided file is determined, and record separation points in the text file are determined.

Specifically, in each of the processes P1 to P3, two scenarios of enclosing-character start (ON) and enclosing-character end (OFF) are assumed. The enclosing-character start (ON) is a state where an enclosing character is assumed to be at a start position for enclosure and where a line feed code is regarded as part of data (data value), while the enclosing-character end (OFF) is a state where the enclosing character is assumed to be at an end position for enclosure. In these scenarios, a line feed code is detected from an assigned divided file, and a position where a record extends over blocks is estimated and held as block analysis information. Subsequently, in each of the processes P1 to P3, in accordance with a result of judgment of the enclosing character state performed in a preceding process preceding the process P1, P2, or P3 and assigned a preceding divided file, the range of a record is determined by using one of the estimated positions where the record extends over blocks.

Thereafter, in each of the processes P1 to P3, in accordance with the determined position where the record extends over blocks, records are extracted from the divided file and transferred to a corresponding one of processes PP1, PP2, and PP3 in which the encoding process is to be executed. As the result, the CSV format of the input file is converted to the DBMS format, and the input file is stored in data DB 15.

Accordingly, it is possible to perform reading in such a manner that a line feed code enclosed by enclosing characters and a line feed code at the end of one row are discriminated from each other and thus possible to perform parallel processing for reading a text file delimited by using delimiters including an extended format code.

Functional Configuration

Figure 2:
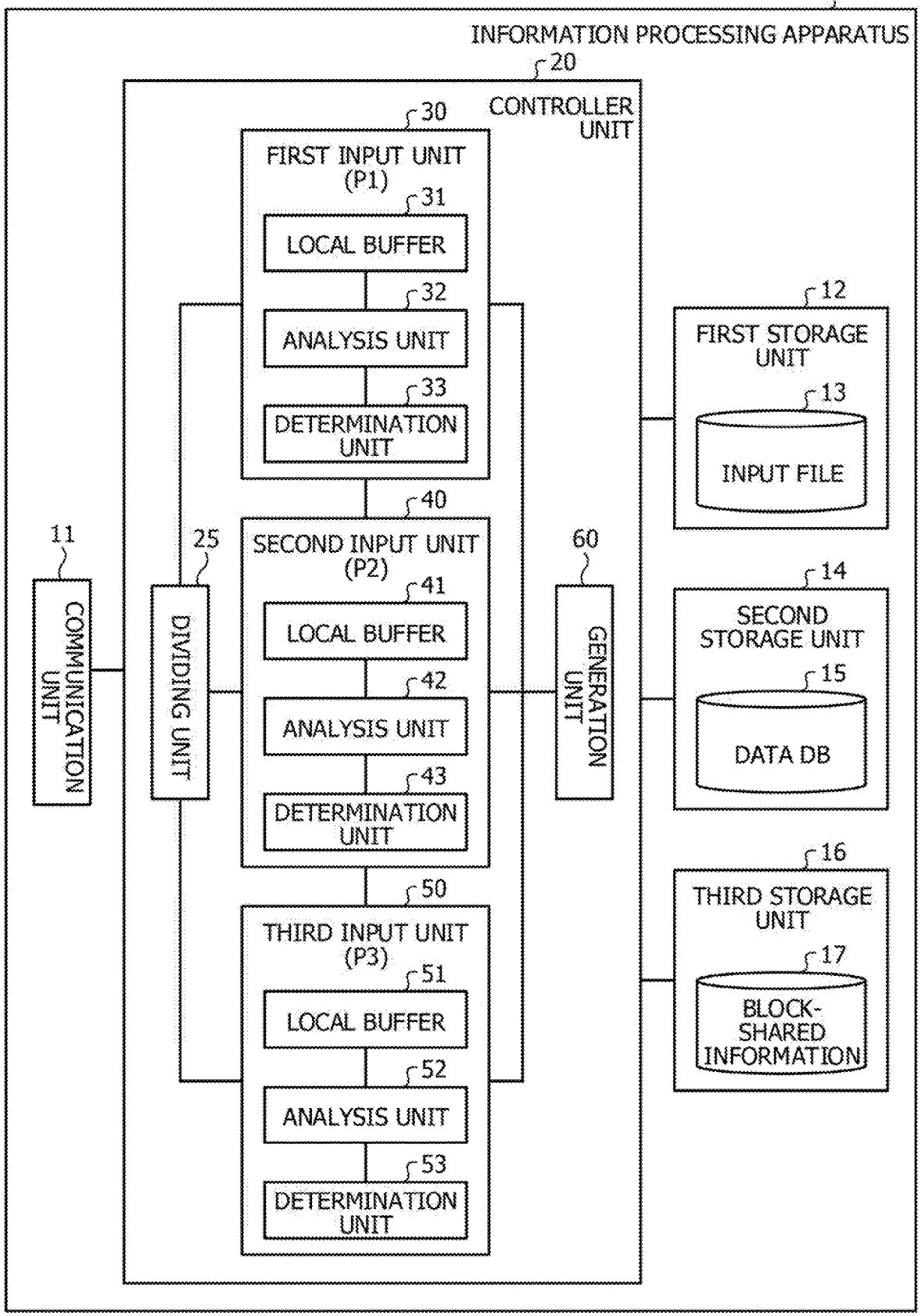
FIG. 2 is a functional block diagram illustrating the functional configuration of an information processing apparatus according to Embodiment 1.

FIG. 2 is a functional block diagram illustrating the functional configuration of an information processing apparatus according to Embodiment 1. As illustrated in FIG. 2, the information processing apparatus 10 includes a communication unit 11, a first storage unit 12, a second storage unit 14, a third storage unit 16, and a controller unit 20.

The communication unit 11 is a communication interface that controls communication between the information processing apparatus 10 and a different system or a different apparatus. For example, the communication unit 11 receives an input file 13 in the CSV format from a different system (not illustrated) and stores the input file in the first, storage unit 12.

Figure 3:
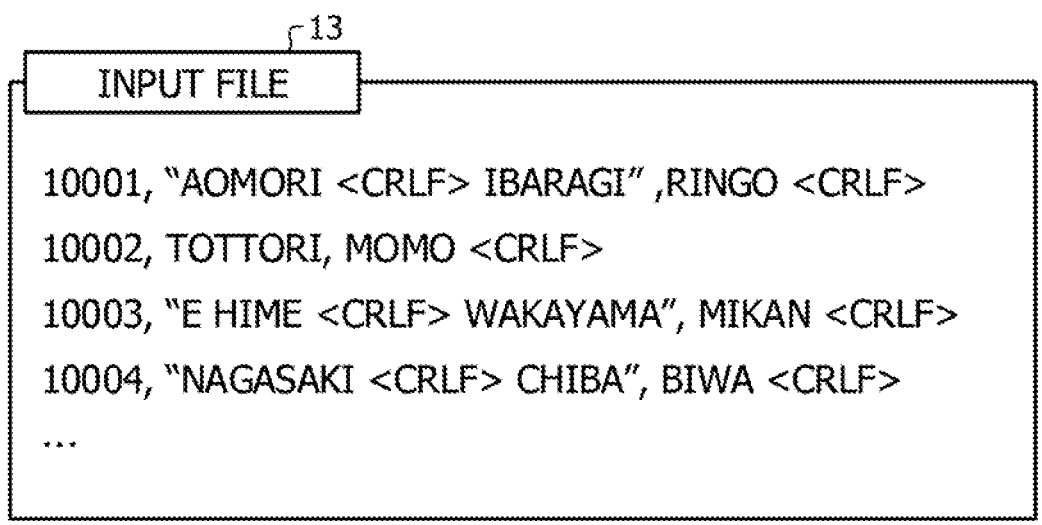
FIG. 3 is a diagram illustrating an example of an input comma-separated values (CSV) file.

The first storage unit 12 is an example of a storage device that stores an input file 13 in the CSV format and is, for example, a RAM (a file cache) or the like. FIG. 3 is a diagram illustrating an example of an input CSV file (input file). As illustrated in FIG. 3, the input file 13 has a data structure (CSV) in which entries are delimited by using a delimiter character such as a comma and in which the end of each row is denoted by a line feed code. Note that a line feed code <CRLF> enclosed in double quotes is handled as part of data, and <CRLF> not enclosed in double quotes denotes a line feed code at the end of a record.

Referring to a CSV file byte by byte from the top enables judgment of whether a double quote is used as an enclosing character disposed at a start position or an end position of enclosure. In contrast, to read the CSV format by simultaneously executing a plurality of processes, levelling by size is typically performed. In this case, a line feed code is not searched for and thus the reading is not performed from the border between logical records. The reading is thus started at a point other than the border. This causes a logical record to extend over a plurality of processes, and it is not possible to perform record-by-record processing in a succeeding process such as the encoding process.

That is, in the parallel processing, each record is not necessarily processed from the top, and thus it is not possible to judge whether the double quote is used as an enclosing character disposed at a start position or an end position of enclosure. For example, reading is started with HIME in the third line in FIG. 3, it is not possible to judge whether a byte currently referred to is within or outside the range of the enclosing characters and thus not possible to judge whether a line feed code <CRLF> appearing next is a line feed code denoting the end of a record or a line feed code serving as data. In this embodiment, whether the line feed code is within or outside the range of the enclosing characters is judged and whether the line feed code <CRLF> is a line feed code denoting the end of the record or a line feed code serving as data is thereby determined. Note that the CSV specifications comply with RFC 4180.

The second storage unit 14 is an example of a storage device that stores a data DB 15 and is, for example, a hard disk or the like. The data DB 15 is a database that stores data in a DBMS record format. Specifically, the data DB 15 stores therein data that is output from the controller unit 20 and that is in the DBMS record format converted from the CSV format of an input file.

The third storage unit 16 is an example of a storage device that stores block-shared information 17 therein, and a memory space of the third storage unit 16 may be referred to by any input unit. The block-shared information 17 stores therein results of analysis in the reading process to be described later. FIG. 4 is a table illustrating example information stored in the block-shared information 17. As illustrated in FIG. 4, the block-shared information 17 has a block No. 171, a range-end enclosure state (A) 172, and a position where a record extending over two blocks is started (hereinafter, referred to as an extending-record start position) (B) 173 that are stored in association with each other.

The block No. 171 is information identifying a block assigned to records of the CSV file in the data input process. The range-end enclosure state (A) 172 is information identifying whether the block identified by the block No. 171 is in an ON state where a byte referred to at the end of the block is within the range of the enclosing characters or an OFF state where the byte is outside the range of the enclosing characters. The extending-record start position (B) 173 is information that identifies the start position of a record lastly detected in the current target block and that indicates the number of bytes counted from the top. FIG. 4 illustrates that the block numbered 1 ends in the ON state where the byte is within the range of the enclosing characters and that the last record starts with the 9984-th byte.

The controller unit 20 is a processing unit for overall control of the information processing apparatus 10 and is, for example, a processor or the like. The controller unit 20 includes a dividing unit 25, a first input unit 30, a second input unit 40, a third input unit 50, and a generation unit 60. Note that the dividing unit 25, the first input unit 30, the second input unit 40, the third input unit 50, and the generation unit 60 are each an example of a process executed by the processor.

In addition, the first input unit 30, the second input unit 40, and the third input unit 50 respectively correspond to the above-described processes P1, P2, and P3 for data input. The generation unit 60 includes the above-described processes PP1, PP2, and PP3 for the encoding process.

The dividing unit 25 is a processing unit that divides the input file 13 and assigns records to be processed to the first, second, and third input units 30, 40, and 50. Specifically, the dividing unit 25 divides the input file 13 in accordance with the number of data input processes to be executed. In the example in FIG. 2, the dividing unit 25 divides the input file 13 into three and assigns divided files to the first input unit 30, the second input unit 40, and the third input unit 50, respectively.

The first input unit 30, the second input unit 40, and the third input unit 50 are each a processing unit that takes in data in a unit corresponding to a DBMS record, from a corresponding one of the divided files that is assigned by the dividing unit 25. Note that the first input unit 30, the second input unit 40, and the third input unit 50 have the same configuration, and thus the first input unit 30 will herein be described. Specifically, a local buffer 31, a local buffer 41, and a local buffer 51 have the same function, an analysis unit 32, an analysis unit 42, and an analysis unit 52 have the same function, and a determination unit 33, a determination unit 43, and a determination unit 53 have the same function.

The first input unit 30 includes the local buffer 31, the analysis unit 32, and the determination unit 33 and is a processing unit that analyzes the assigned CSV divided file and takes in data in a unit corresponding to a DBMS record. The analysis unit 32 is an example of an identification unit, and the determination unit 33 is an example of a determination unit.

The local buffer 31 is a memory area for storing the divided file. Specifically, the local buffer 31 is a local area for a process and functions as a file cache. The local buffer 31 holds the divided file resulting from the division performed by the dividing unit 25.

The analysis unit 32 is a processing unit that assumes two scenarios in which the respective start states of the enclosing characters are OFF and ON and that performs CSV analysis based on each of the two scenarios. Specifically, the analysis unit 32 refers to a target record byte by byte on the assumption that reading is started with the enclosing character in the OFF state and identifies a record separation point b1. The analysis unit 32 also refers to the target record byte by byte on the assumption that reading is started with the enclosing character in the ON state and identifies a record separation point b2.

Figure 5:
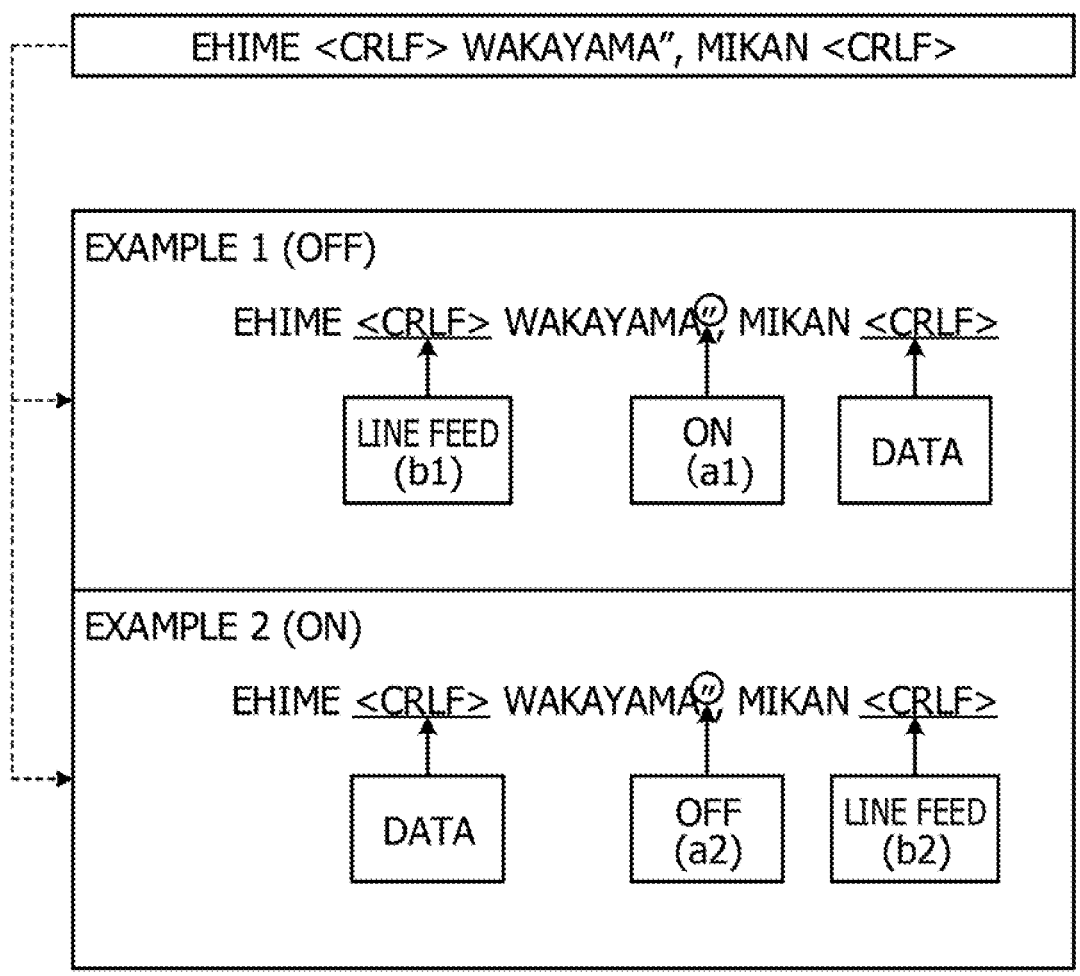
FIG. 5 is a diagram explaining a specific example analysis.

An analysis method will be described by using FIG. 5. FIG. 5 is a diagram explaining a specific example analysis. In the example illustrated in FIG. 5, EHIME<CRLF>WAKAYAMA", MIKAN<CRLF> is assigned to the first input unit 30 (P1).

First, the analysis unit 32 performs analysis on the assumption that the enclosure state of an enclosing character is OFF. Specifically, as illustrated in Example 1 in FIG. 5, the analysis unit 32 refers to a record byte by byte from E located at the top. When a first <CRLF> appears, the analysis unit 32 judges that <CRLF> is a line feed code because the enclosure state is OFF. When a double quote appears, the analysis unit 32 judges that the double quote denotes the start of an enclosed state because the current enclosure state is OFF and changes the enclosure state to ON. Subsequently, when a second <CRLF> appears, the analysis unit 32 judges that the <CRLF> is data because the current enclosure state is ON. As the result, the analysis unit 32 collects positional information regarding a byte one byte after the first <CRLF> (for example, what number the byte is), the first <CRLF> serving as a line feed code b1 when the enclosure state is assumed to be OFF. The analysis unit 32 also collects a final enclosure state a1=ON. In other words, when the process is started (called) in the OFF enclosure state, the analysis unit 32 assumes that a line feed is performed at a position one byte after the first <CRLF> and then a new record is started.

Secondly, the analysis unit 32 performs the analysis on the assumption that the enclosure state is ON. Specifically, as illustrated in Example 2 in FIG. 5, the analysis unit 32 refers to the record byte by byte from E at the top. When the first <CRLF> appears, the analysis unit 32 judges that <CRLF> is data because the current enclosure state is ON. When the double quote appears, the analysis unit 32 judges that the double quote denotes the end of the enclosure state because the current enclosure state is ON and changes the enclosure state to OFF. Subsequently, when the second <CRLF> appears, the analysis unit 32 judges that the <CRLF> is a line feed code because the current enclosure state is OFF. As the result, the analysis unit 32 collects positional information regarding a byte one byte after the last <CRLF> (for example, what number the byte is), the last <CRLF> serving as a line feed code b2 when the enclosure state is assumed to be ON. The analysis unit 32 also collects a final enclosure state a2=OFF. Specifically, when the process is started in the ON enclosure state, the analysis unit 32 assumes that a line feed is performed at a position one byte after the last <CRLF> and then a new record is started.

The analysis unit 32 notifies the determination unit 33 of the identified pairs of a1 and b1 and a2 and b2. Note that operations for referring to the target record byte by byte do not have to be performed for the respective OFF and ON enclosure states. In one operation for referring to the target record byte by byte, judgements for the respective OFF and ON enclosure states are performed. That is, the target record does not have to be referred to two times, and the analysis may be performed in one referring operation.

The determination unit 33 is a processing unit that determines which pair of pieces of information resulting from the analysis performed by the analysis unit 32 is to be employed. Specifically, the determination unit 33 stores, in a memory area of the determination unit 33, the pairs of a1 and b1 and a2 and b2 notified from the analysis unit 32. The determination unit 33 acquires the result of the process performed on the preceding block. Thereafter, if the enclosure state of the preceding block is determined to be OFF, the determination unit 33 employs a1 and b1. If the enclosure state of the preceding block is determined to be ON, the determination unit 33 employs a2 and b2.

Here, an example in which the determination unit 33 performs notification to a process that processes a block (described later) after the determination of the information will be described. FIG. 6 is a diagram explaining an example of updating block-shared information. FIG. 6 illustrates the example of the process assigned a second block (divided file).

As illustrated in FIG. 6, the determination unit 33 manages, in association with a processing target block numbered 2, the cases where the enclosure state of the range start point is OFF and where the enclosure state of the range start point is ON that are obtained by the determination unit 33. Specifically, the determination unit 33 holds a1=(ON) and b1=19885 (byte) for the case where the enclosure state of the range start point is OFF and a2=(OFF) and b2=19225 (byte) for the case where the enclosure state of the range start point is ON. The determination unit 33 thereafter monitors the block-shared information 17. After a process that processes a preceding block numbered 1 (hereinafter, simply referred to as a block 1 in some cases) stores the block-shared information regarding the block 1, the determination unit 33 determines information to be employed.

In FIG. 6, the determination unit 33 refers to the block-shared information 17, thereby detects registration of the range-end enclosure state (A) 172=ON performed in association with the block 1, and judges that a block 2 serving as a target block for the determination unit 33 is started in the ON state. As the result, the determination unit 33 employs a2=(OFF) and b2=19225 (byte) associated with the case where the enclosure state of the range start point is ON. The determination unit 33 discards a1=(ON) and b1=19885 (byte) associated with the case where the enclosure state of the range start point is OFF.

The determination unit 33 associates the block numbered 2 with the range-end enclosure state (A) 172=OFF and the extending-record start position (B) 173=19225 (byte) and adds the information to the block-shared information 17. As the result, a process assigned a block 3 may judge that the block 3 serving as a target for the process is started in the OFF state.

The determination unit 33 also reads records from the local buffer 31 in accordance with the determined information and outputs the records to the generation unit 60. For example, in the example in FIG. 6, the determination unit 33 refers to the records again byte by byte from the 9984-th byte that is the extending-record start position (B) 173 in the block 1 to the 19224-th byte and identifies a record separation point. The determination unit 33 then identifies records that exist from the 9984-th byte to the 19224-th byte and outputs the records to the generation unit 60. Note that a record extending over processes is processed by a process for a succeeding block. For example, a record extending over the block 1 and the block 2 is transferred by the process for the block 2.

The generation unit 60 is a processing unit that executes the encoding process, the index generation process, and other processes on records input from the determination unit 33. The generation unit 60 executes these processes, thereby takes in data from the file in a unit corresponding to a DBMS record, and stores the data in the data DB 15.

Data Input (CSV Analysis) Parallel Processing

Figure 7:
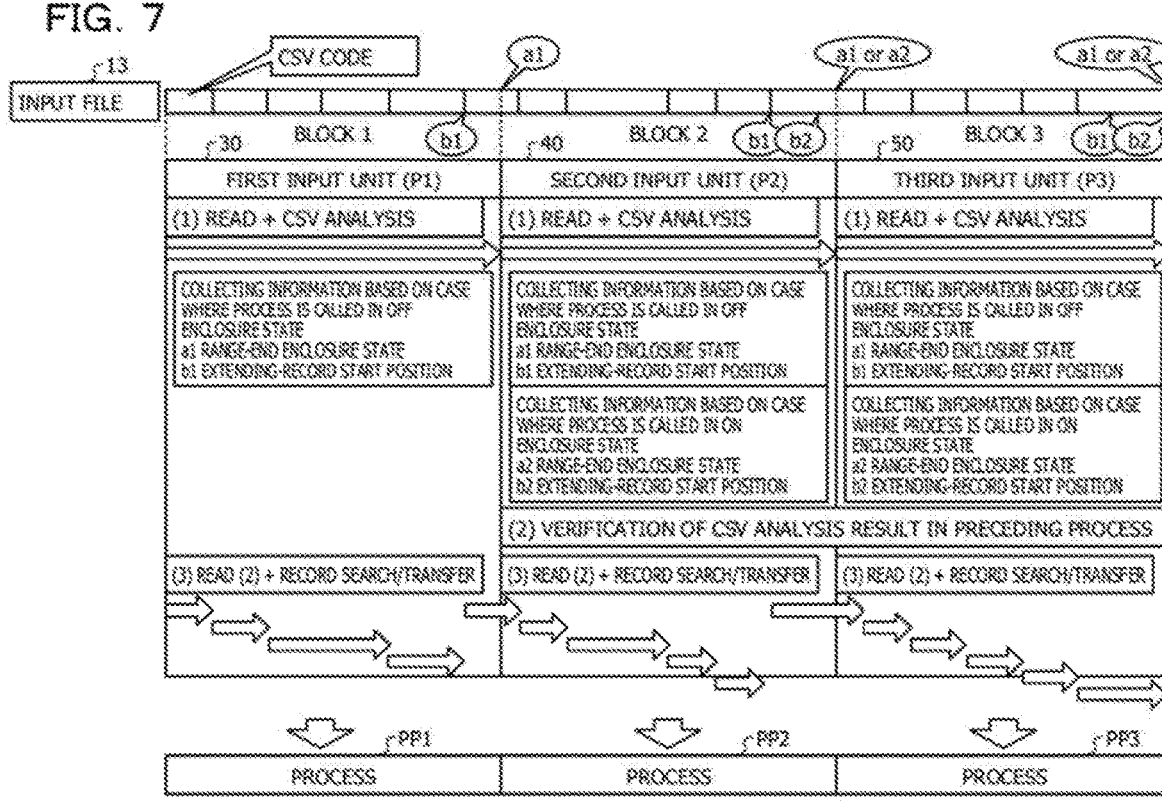
FIG. 7 is a diagram explaining CSV analysis parallel processing.

The parallel processing performed by the first input unit 30, the second input unit 40, and the third input unit 50 will be described. FIG. 7 is a diagram explaining CSV analysis parallel processing. As illustrated in FIG. 7, the dividing unit 25 divides an input file 13 into a block 1, a block 2, and a block 3. The block 1 is assigned to the first input unit 30 (process P1), the block 2 is assigned to the second input unit 40 (process P2), and the block 3 is assigned to the third input unit 50 (process P3).

The processes P1, P2, and P3 each perform block reading (a Read process) and the CSV analysis in parallel ((1) in FIG. 7). Specifically, the process P1 is assigned the top block 1 and thus collects information a1 and b1 on the assumption that the process P1 is called only in the OFF enclosure state. The process P2 collects information a1 and b1 on the assumption that the process P2 is called in the OFF enclosure state and also collects information a2 and b2 on the assumption that the process P2 is called in the ON enclosure state. The process P3 collects information a1 and b1 on the assumption that the process P3 is called in the OFF enclosure state and also collects information a2 and b2 on the assumption that the process P3 is called in the ON enclosure state.

Thereafter, each of the process P2 and the process P3 verifies the result of the CSV analysis performed by the corresponding process that processes a preceding block and determines a correct enclosure start state ((2) in FIG. 7). Specifically, the process P2 selects one of a1 and a2 and one of b1 and b2 in accordance with the judgment result of the final enclosure state of the process P1 that is one of ON and OFF. Likewise, the process P3 selects one of a1 and a2 and one of b1 and b2 in accordance with the judgment result of the final enclosure state of the process P2 that is one of ON and OFF.

Subsequently, after the enclosure state a1 or a2 and the extending-record start position b1 or b2 are determined, each of the processes P1 to P3 reads records from the divided file and outputs the records to the corresponding succeeding process ((3) in FIG. 7). For example, while identifying the range of each record in the block 1 by referring again to the record from the top of the block 1 to the position b1, the process P1 outputs the identified record to the encoding PP1 that is the encoding process PP1.

Likewise, while identifying the range of each record in the block 2 by referring again to the record from the position b1 collected by the process P1 to the determined position b1 or b2, the process P2 outputs the identified record to the encoding PP2. Likewise, while identifying the range of each record in the block 3 by referring again to the record from the position b1 or b2 employed by the process P2 to the determined position b1 or b2, the process P3 outputs the identified record to the encoding PP3. Note that a record extending over the block 1 and the block 2 is processed by the process P2, and a record extending over the block 2 and the block 3 is processed by the process P3.

As described above, the processes P1 to P3 each perform the CSV analysis and the record reading in parallel, and the data is stored in the DBMS.

Processing Flow

The above-described CSV file analysis process will be described. In the description, each of the first input unit 30, the second input unit 40, and the third input unit 50 is referred to as a data input unit 70, for example.

Figure 8:
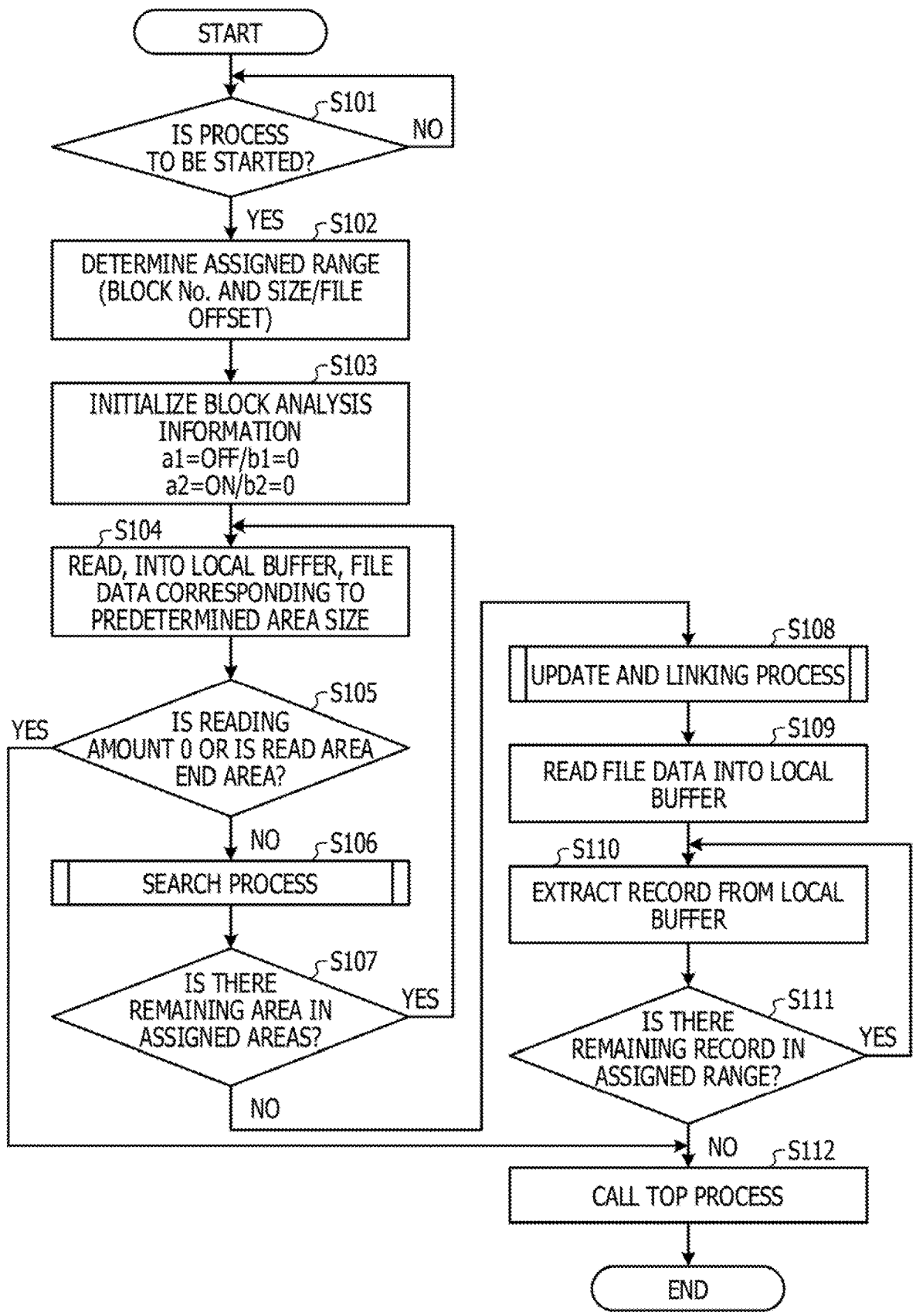
FIG. 8 is a flowchart illustrating the flow of a CSV file analysis process.

FIG. 8 is a flowchart illustrating the flow of a CSV file analysis process. As illustrated in FIG. 8, in response to a process start instruction (Yes in S101), the dividing unit 25 determines an assigned range for each process (S102). Specifically, the dividing unit 25 divides the input file 13 that is an input file into blocks the number of which is equal to the number of processes and acquires and holds a block No. 171, a size, a file offset, and the like.

The data input unit 70 initializes block analysis information (S103). Specifically, the data input unit 70 sets a1=OFF, b1=0, a2=ON, and b2=0.

The data input unit 70 reads data of a file resulting from the division (divided file) into the local buffer, the data corresponding to an area of a predetermined size (S104). If the size of the read area of the file (a reading amount) is 0 or the read area is not the end area of the divided file (No in S105), the data input unit 70 executes a search process for detecting an enclosure state and a border position in record (S106).

Thereafter, if there is a remaining area in the assigned areas (Yes in S107), the data input unit 70 repeats S104 and succeeding steps. For example, if the divided file has an unprocessed area, the data input unit 70 reads the unprocessed area into the local buffer and executes the processing steps after the reading.

In contrast, if there is not a remaining area in the assigned areas (No in S107), the data input unit 70 executes an update and linking process for identifying an enclosure state and a border position in record (S108).

Upon completion of the update and linking process, the data input unit 70 reads the data of the divided file into the local buffer as in S104 (S109). The data input unit 70 refers to the divided file byte by byte in accordance with the enclosure state and the border position in record that are identified, identifies a record, and extracts the record from the local buffer (S110).

Thereafter, if a record to be read remains in the assigned range (Yes in S111), the data input unit 70 repeats S110 and succeeding steps. In contrast, if a record to be read does not remain in the assigned range (No in S111), the data input unit 70 deletes the process of the data input unit 70 from a process management queue that manages processes and calls a process at the top of the process management queue (S112).

Note that if the size of the area (a reading amount) is 0 or the read area is the end area of the divided file in S105 (Yes in S105), the data input unit 70 performs S112.

Search Process Flow

Figure 9:
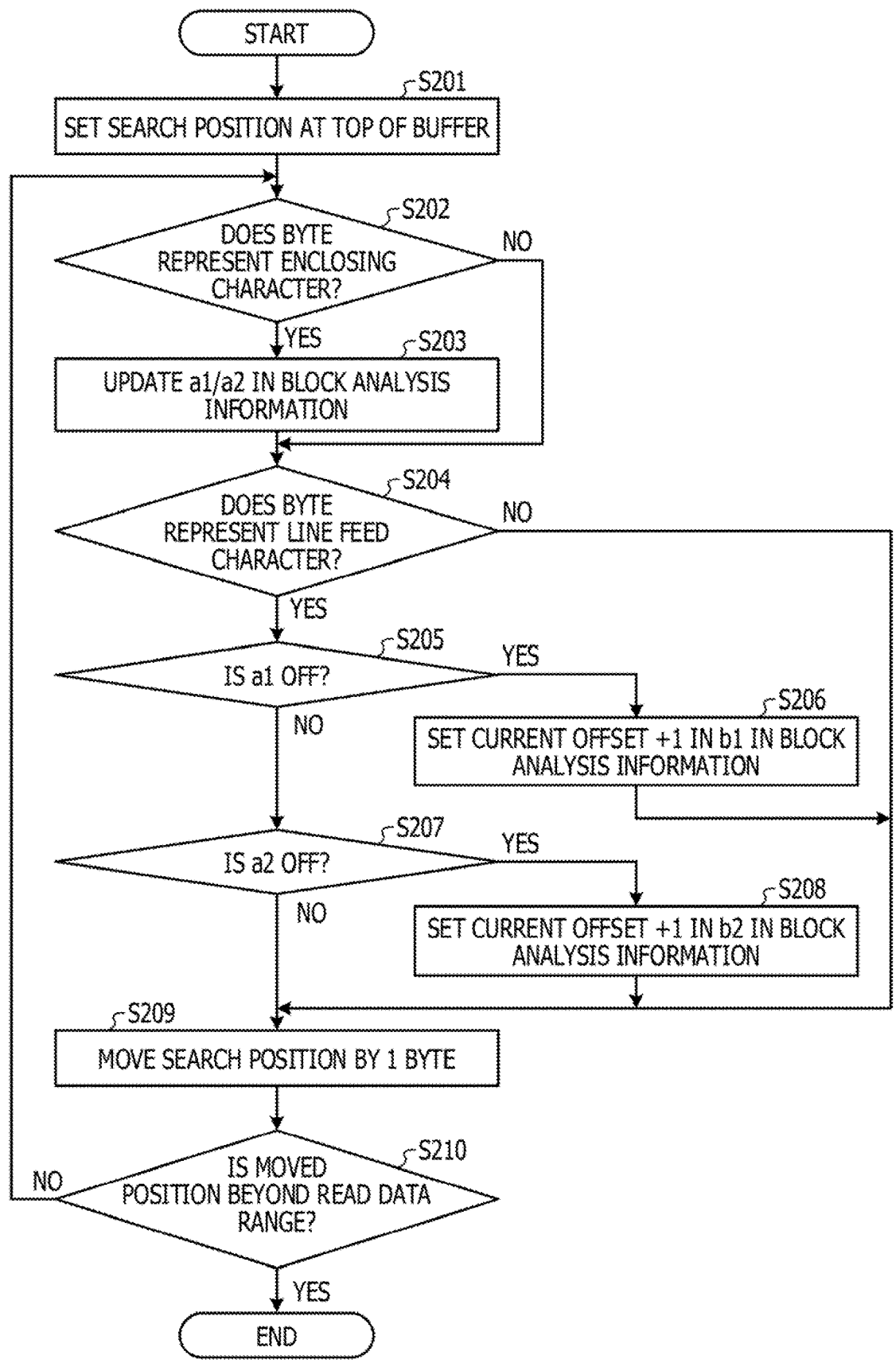
FIG. 9 is a flowchart illustrating the flow of a search process.

The search process in S106 in FIG. 8 will be described. FIG. 9 is a flowchart illustrating the flow of the search process. As illustrated in FIG. 9, the data input unit 70 sets a search position at the top of the local buffer (S201). The data input unit 70 refers to the byte at the position and judges whether the byte represents an enclosing character (S202).

If the byte referred to represents an enclosing character (Yes in S202), the data input unit 70 updates the enclosing character state a1 or a2 in the block analysis information (S203). Specifically, the data input unit 70 updates a1 and a2 on the assumption that the enclosing character is called in the ON state and the OFF state, respectively. For example, the data input unit 70 sets a1 ON if the current a1 is OFF and sets a1 OFF if the current a1 is ON. Likewise, the data input unit 70 sets a2 ON if the current a2 is OFF and sets a2 ON if the current a2 is OFF.

If the byte referred to in S202 is not an enclosing character (No in S202), or if S203 is complete, the data input unit 70 judges whether the byte referred to is a line feed character (S204).

If the byte referred to is a line feed character (Yes in S204), and if the enclosing character state a1 is OFF (Yes in S205), the data input unit 70 sets current offset +1 in the extending-record start position b1 in the block analysis information (S206).

In contrast, if the byte referred to is a line feed character (Yes in S204), if the enclosing character state a1 is ON (No in S205), and if the enclosing character state a2 is OFF (Yes in S207), the data input unit 70 sets current offset +1 in the extending-record start position b2 in the block analysis information (S208).

The data input unit 70 moves the search position by one byte (S209). If the moved position is not beyond the range of the read data (No in S210), the data input unit 70 repeats S202 and succeeding steps. In contrast, if the moved position is beyond the range of the read data (Yes in S210) after the data input unit 70 moves the search position by one byte (S209), the data input unit 70 terminates the search process.

In contrast, if the byte referred to is not a line feed character in S204 (No in S204), the data input unit 70 performs S209 and succeeding steps. Note that if the enclosing character state a2 is not OFF in S207 (No in S207), the data input unit 70 also performs S209 and succeeding steps.

Update and Linking Process Flow

Figure 10:
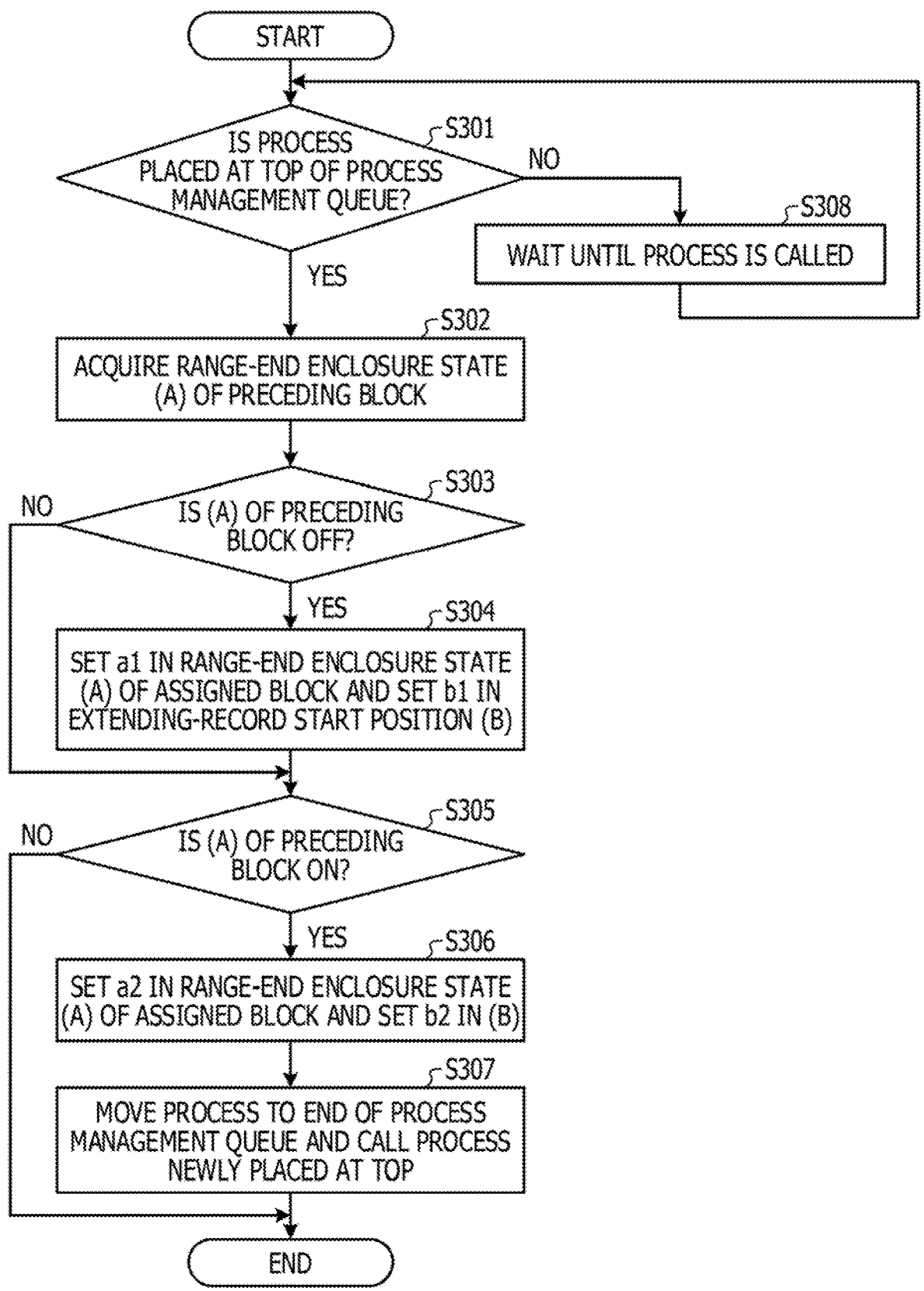
FIG. 10 is a flowchart illustrating the flow of an update and linking process.

The update and linking process in S108 in FIG. 8 will be described. FIG. 10 is a flowchart illustrating the flow of the update and linking process. As illustrated in FIG. 10, if the data input unit 70 is placed at the top of the process management queue and if the turn of the data input unit 70 comes (Yes in S301), the data input unit 70 acquires the range-end enclosure state (A) 172 of the previous block in the block-shared information 17 (S302).

If the range-end enclosure state (A) 172 of the previous block is OFF (Yes in S303), the data input unit 70 adds, to the block-shared information 17, a record in which a1 is set as the range-end enclosure state (A) 172 and b1 is set as the extending-record start position (B) 173 in association with the No. of the assigned block (S304).

In contrast, if the range-end enclosure state (A) 172 of the previous block is not OFF but ON (No in S303 and Yes in S305), the data input unit 70 adds, to the block-shared information 17, a record in which a2 is set as the range-end enclosure state (A) 172 and b2 is set as the extending-record start position (B) 173 in association with the No. of the assigned block (S306). The data input unit 70 moves the process of the data input unit 70 to the end of the process management queue and calls a process newly placed at the top (S307).

Note that if the range-end enclosure state (A) 172 of the previous block is neither OFF nor ON (No in S303 and No in S305), the data input unit 70 terminates the update and linking process. If the turn of the data input unit 70 has not come yet (No in S301), the data input unit 70 waits until a process that processes the preceding block calls the data input unit 70 (S308).

Effects

As described above, in the first-round parallel reading, the information processing apparatus 10 performs the CSV analysis based on the assumed scenarios in which the states of the enclosing character are respectively ON and OFF. After a process analyzes all of the areas of the CSV file, a process that processes a succeeding block refers to information acquired after the process that processes the block preceding the succeeding block completes the analysis. The information enables each process to judge whether the corresponding assigned block is started in the ON or OFF enclosing character state and to determine the position of a line feed code denoting the end of a record with reference to the result of the analysis of the process. The second-round parallel reading enables the process to start reading of the records from the top of the first record and transferring the records to the corresponding encoding unit. Note that the order of reading in the second-round is not limited to the order from the top and may be an order according to an order from a top portion. If the state of the preceding block is determined, reading of the succeeding block may be started.

Accordingly, the information processing apparatus 10 may perform parallel reading processes of one file and parallel end-position analysis processes, and thus parallel loader processes may be executed on even one file. In addition, for a file having even an excessively large size not loadable in a file cache in preprocessing, the range is limited in the first round reading and the CSV analysis performed by each process, and thereby the file cache may be utilized reliably in the second-round reading.

Embodiment 2

In Embodiment 1, the example in which an input file is divided by the number of processes (data input units), but the embodiment of the disclosure is not limited to this. For example, the input file may be divided based on the size of a local folder that is a file cache for each process.

In Embodiment 1, if the size of an assigned divided file is larger than the size of the file cache, a plurality of input-output operations are performed for the CSV analysis. In Embodiment 2, an example in which the number of times the input-output operations are performed is reduced by dividing the input file based on the size of the file cache and thereby the parallel processing is speeded up will be described.

Assignment Control

Figure 11:
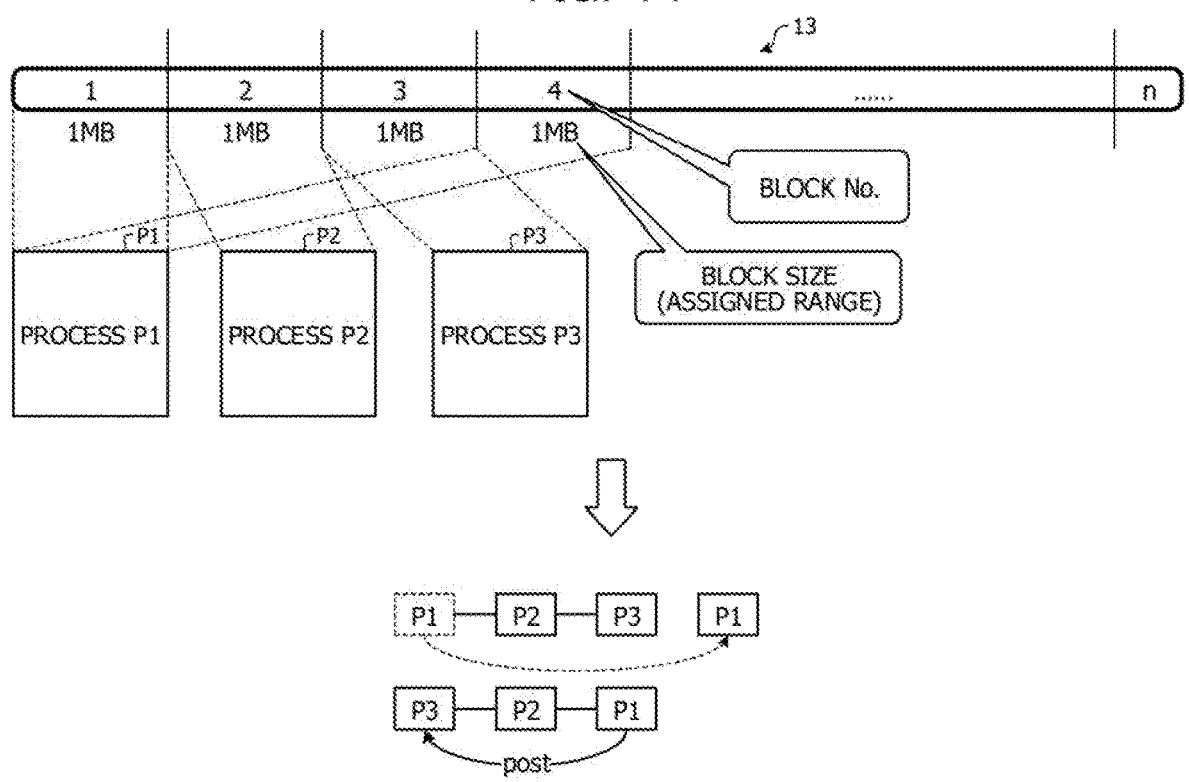
FIG. 11 is a diagram explaining input file assignment according to Embodiment 2.

FIG. 11 is a diagram explaining input file assignment according to Embodiment 2. With reference to FIG. 11, an example in which a 1-MB file cache is used will be described. In this case, the dividing unit 25 divides the input file by 1 MB and generates n divided files. The dividing unit 25 assigns a block 1, a block 2, and a block 3 to a process P1, a process P2, and a process P3, respectively.

Thereafter, upon completion of the CSV analysis of the block 1, the process P1 moves to the end of the process management queue, calls the process P2, and causes the process P2 to determine at and the like. The process P1 also reads a block 4 and performs the CSV analysis.

As described above, the assignment may be performed serially up to a block n in the order of the processes P1, P2, and P3 or may be performed in such a manner that a remaining block is assigned in an order in which a process completes assumption of at and the like.

Parallel Processing

Figure 12:
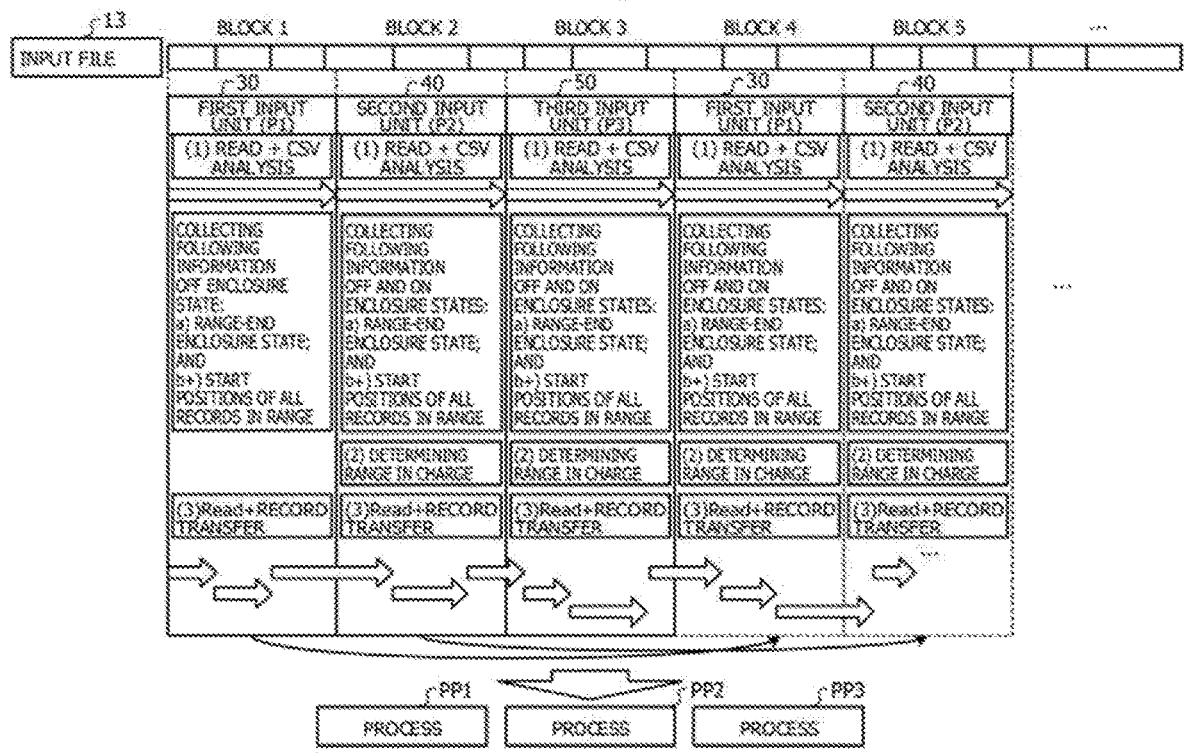
FIG. 12 is a diagram explaining a CSV analysis method according to Embodiment 2.

The parallel processing performed by the processes (the first input unit 30, the second input unit 40, and the third input unit 50) will be described. FIG. 12 is a diagram explaining a CSV analysis method according to Embodiment 2. As illustrated in FIG. 12, the dividing unit 25 divides the input file 13 by 1 MB. The dividing unit 25 assigns the block 1, the block 2, and the block 3 to the first input unit 30 (process P1), the second input unit 40 (process P2), and the third input unit 50 (process P3), respectively.

Thereafter, the processes each perform the block reading (Read process) and the CSV analysis ((1) in FIG. 12) in parallel in the same manner as in Embodiment 1. Thereafter, each process verifies the result of the CSV analysis performed by the corresponding process that processes a preceding block and determines a correct enclosure start state ((2) in FIG. 12). After the enclosure state and the extending-record start position are determined, the process reads records from the divided file and outputs the records to the corresponding succeeding process ((3) in FIG. 12).

Here, a difference from Embodiment 1 is described. In the CSV analysis, the start position of the last record, among records appearing in the assigned block, which extends over the border between the assigned block and the next block (the extending-record start position) is acquired in Embodiment 1, while the start positions of all of the records appearing in the block are acquired in Embodiment 2. Specifically, in Embodiment 2, all of the characters <CRLF> in the OFF enclosure state are detected in the block. In Embodiment 1, the divided file has a considerably large size in some cases, and if the start positions of all of the records are acquired, there is a possibility of a processing delay. In contrast, in Embodiment 2, the size of the divided file is 1 MB that is relatively small, and thus there is a low possibility of the processing delay.

Specifically, the process P1 is assigned the top block 1 and thus collects the range-end enclosure state a1 and the start positions b1+ of all records appearing in the block 1 on the assumption that the process P1 is called in the OFF enclosure state. Thereafter, the process P1 reads the block 4 and executes the same process. At this time, the process P1 performs the analysis on the assumption that the process P1 is called in the OFF and ON enclosure states, respectively.

The process P2 collects information indicating the range-end enclosure state a1 and the start positions b1+ of all records in the block 2 on the assumption that the process P2 is called in the OFF enclosure state and also collects information indicating the range-end enclosure state a2 and the start positions b2+ of all records in the block 2 on the assumption that the process P2 is called in the ON enclosure state. Thereafter, the process P2 reads a block 5 and executes the same process.

The process P3 collects information indicating the range-end enclosure state a1 and the start positions b1+ of all records in the block 3 on the assumption that the process P3 is called in the OFF enclosure state and also collects the range-end enclosure state a2 and the start positions b2+ of all records in the block 3 on the assumption that the process P3 is called in the ON enclosure state. Thereafter, the process P3 reads a block 6 and executes the same process.

Subsequently, after the range-end enclosure state (A) 172 of the block 1 is determined, the process P2 selects one of the assumed enclosure states in accordance with the determination result. For example, if the range-end enclosure state (A) 172 of the block 1 is determined to be ON, the process P2 employs the information indicating the range-end enclosure state a2 and b2+ collected on the assumption that the enclosure state is ON. Thereafter, the process P2 does not have to analyze the block 2 again. The process P2 reads the records from the block 2 in accordance with the collected start positions b2+ of all records and outputs the records to the encoding to be described later. Note that the same process is executed in processes succeeding the process P3.

Block-Shared Information Management

Figure 13:
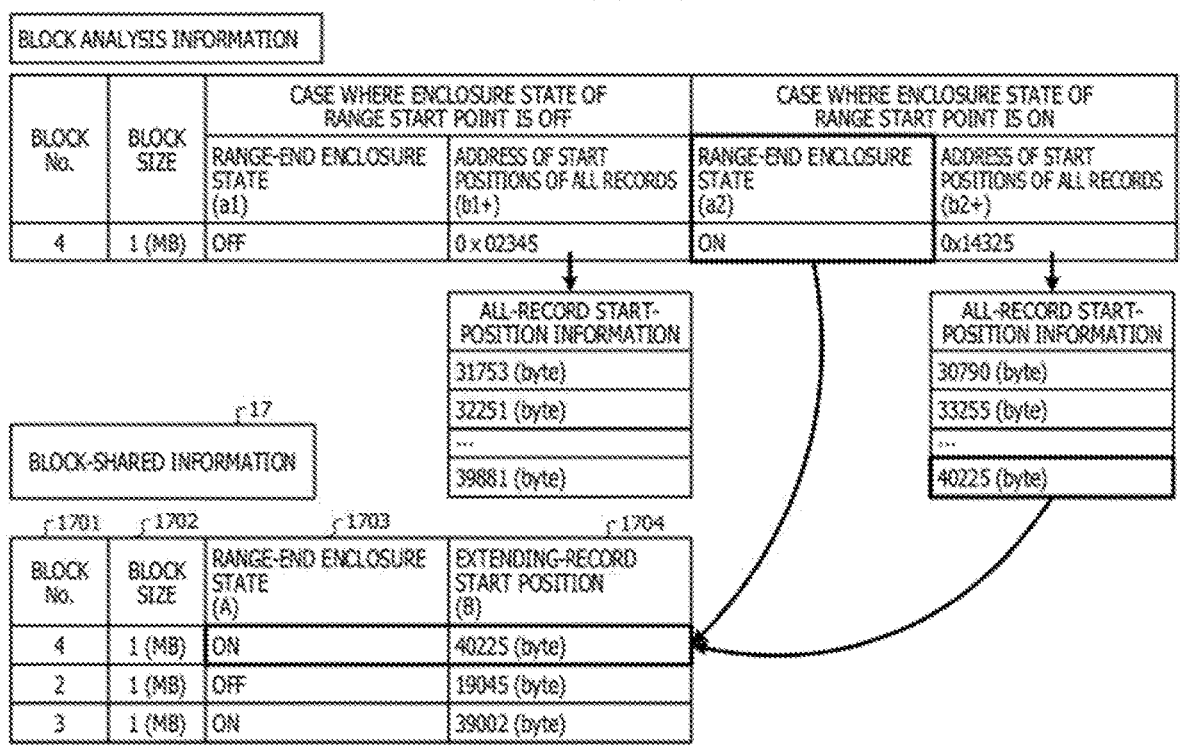
FIG. 13 is a diagram explaining an example of updating block-shared information according to Embodiment 2.

A form of management of the block-shared information 17 will be described, the form being different from that in Embodiment 1. Unlike Embodiment 1, the start positions of all records in the block are managed in Embodiment 2. FIG. 13 is a diagram explaining an example of updating block-shared information according to Embodiment 2. In Embodiment 2, as illustrated in FIG. 13, each process manages a block No. 1701, a block size 1702, the case where the enclosure state of the range start point is OFF 1703, and the case where the enclosure state of the range start point is ON 1704 in association with each other.

The 1701 is information identifying a processed block. The block size 1702 is the size of the processed block. In the case where the enclosure state of the range start point is OFF, the range-end enclosure state a1 and an address b1+ of the information indicating the start positions of all records are set, the range-end enclosure state a1 and the address b1+ being collected on the assumption that the process is called in the OFF enclosure state. In the case where the enclosure state of the range start point is ON, the range-end enclosure state a2 and an address b2+ of the information indicating the start positions of all records are set, the range-end enclosure state a2 and the address b2+ being collected on the assumption that the process is called in the ON enclosure state.

FIG. 13 illustrates an example in which the process P1 is assigned a fourth block (divided file). As illustrated in FIG. 13, in association with a processing target block numbered 4 and the block size 1702=1 MB, the process P1 stores a1=OFF and b1+=0x02345 for the case where the enclosure state of the range start point is OFF and also stores a2=ON and b2+=0x14325 for the case where the enclosure state of the range start point is ON.

Specifically, the process P1 stores, in an area started with a predetermined address 0x02345, the start positions 31753, 32251, . . . of all records in the block 4 collected on the assumption that the process P1 is called in the OFF enclosure state. The process P1 also stores, in an area started with a predetermined address 0x14325, the start positions 30790, 33255, . . . of all records in the block 4 collected on the assumption that the process P1 is called in the ON enclosure state.

The process P1 monitors the block-shared information 17. After the range-end enclosure state (A) 1702=ON and the extending-record start position (B) 1703=39002 are added for the preceding block 3, the process P1 judges that the block 4 is started in the ON enclosure state. As the result, the process P1 employs the block analysis information a2 and b2+ that are associated with the case where the enclosure state of the range start point is ON. Specifically, the process P1 updates the block-shared information 17 with the block No. 171=4, the block size=1, the range-end enclosure state (A) 172=ON, and the extending-record start position (B) 173=40225 being associated with each other. Note that information indicating the last start position closest to the next block among the pieces of information indicating the start positions of all records that are collected in the block 4 is selected as the extending-record start position (B) 173. The information newly registered in this manner serves as information to be taken over to the process P2 in charge of the block 5.

Effects

According to Embodiment 2 as described above, the start positions of all records in the range of a block are stored in the memory in the first-round analysis. Line feed codes do not have be searched for in the second-round analysis, and thus only transfer is performed. Accordingly, an amount of CPU processing does not differ from that in methods typically performed to date, and thus an improved performance in the parallel processing is obtained.

Embodiment 3

The embodiments have heretofore been described, but an embodiment other than the above-described embodiments may be implemented in various different forms. Hereinafter, a different embodiment will be described.

Specifying CSV

The embodiments have been described by using the double quotes as an example of the extended format code and a comma for separation as an example of the delimiter, but an embodiment of the disclosure is not limited to these. A character to be used as an enclosing character may be specified in advance, and a space, a tab, a semicolon, or the like may be used as a delimiter.

Changing Division Size Setting

In Embodiment 2, the example in which the CSV analysis range is limited to 1 MB has been described. If a CSV record having a length (for example, 2 MB) exceeding this range appears frequently, a process without the record transfer ((3) in FIG. 12) occurs frequently, and thus efficiency is deteriorated. Hence, if a CSV record of a size exceeding the size of the initially determined CSV analysis range is detected as a result of the determination (2) in FIG. 12, all of the processes are temporarily stopped after the record transfer ((3) in FIG. 12) is complete. Thereafter, the setting of the CSV analysis range is changed to a larger size setting. For example, if a 2-MB CSV record is detected in the determination process while the CSV analysis process is being executed by using an initial value of 1 MB, the analysis range is increased to 10 MB after the record transfer process is complete. Thereafter, the CSV analysis process is executed again.

System

The information including the processing steps, the control steps, the specific names, the various pieces of data, and the parameters described in this document and the drawings may be optionally changed unless otherwise specially noted.

The components of the illustrated apparatuses are based on a functional concept and do not necessarily have the physical configuration as illustrated. In other words, the specific forms of distribution or integration of the apparatuses are not limited to the illustrated form. Specifically, all or part of the apparatuses may be configured in such a manner as to be functionally or physically distributed or integrated in any unit in accordance with any of various loads or use states. Further, all or part of the processing functions implemented by the apparatuses may be implemented by the CPU or a program that is analyzed and run by the CPU or may be implemented as hardware using wired logic.

Hardware Configuration

Figure 14:
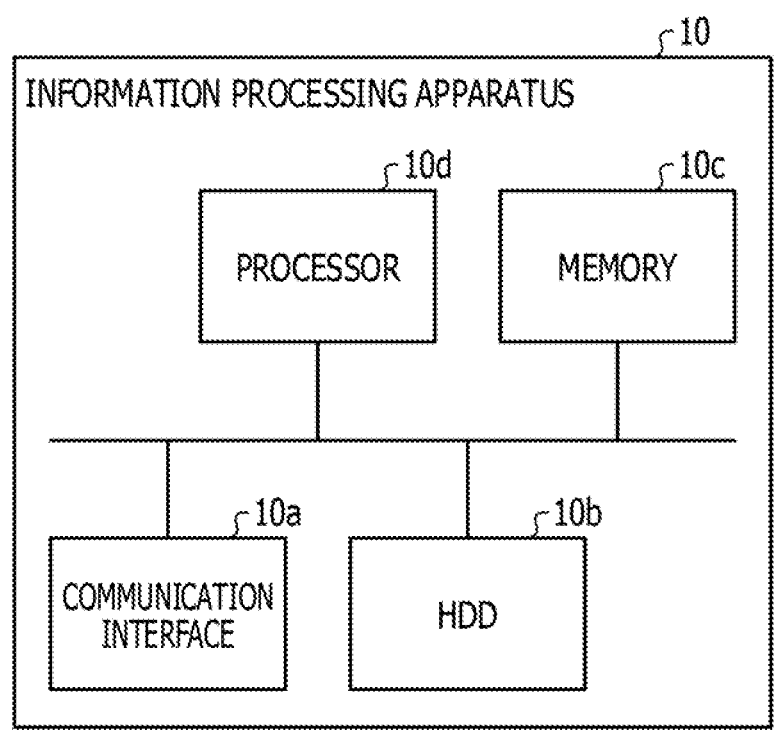
FIG. 14 is a diagram explaining an example hardware configuration.

An example hardware configuration of the information processing apparatus 10 will be described. FIG. 14 is a diagram explaining an example hardware configuration. As illustrated in FIG. 14, the information processing apparatus 10 includes a communication interface 10a, a hard disk drive (HDD) 10b, a memory 10c, and a processor 10d.

The communication interface 10a is a network interface card or the like that controls communication with different apparatuses. The HDD 10b is an example of a storage device that stores programs, data, and the like.

Examples of the memory 10c include a RAM such as a synchronous dynamic random access memory (SDRAM), a read only memory (ROM), and a flash memory. Examples of the processor 10d include a CPU, a digital signal processor (DSP), a field programmable gate array (FPGA), and a programmable logic device (PLD).

The information processing apparatus 10 serves as an information processing apparatus that performs a reading method by reading and running a program. Specifically, the information processing apparatus 10 runs a program that implements the same functions as those of the dividing unit 25, the first input unit 30, the second input unit 40, the third input unit 50, and the generation unit 60. As the result, the information processing apparatus 10 may execute processes that implement the same functions of those of the dividing unit 25, the first input unit 30, the second input unit 40, the third input unit 50, and the generation unit 60. Note that the running of the program in this embodiment is not limited to the running by the information processing apparatus 10. For example, the embodiments are applicable to a case where a different computer or a server runs the program or where these apparatuses run the program in cooperation with each other.

The program may be distributed via a network such as the Internet. In addition, the program may be run by a computer in such a manner as to be stored in a computer-readable recording medium such as a hard disk, a flexible disk (FD), a compact disk ROM (CD-ROM), a magneto-optical disk (MO), or a digital versatile disc (DVD) and as to be read from the computer-readable recording medium by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a processing, the processing comprising:

identifying, by a plurality of processes, at least one candidate for a record separation point from text data in each of a plurality of divided files, the plurality of divided files being generated by dividing a text file corresponding to pieces of record data delimited by a delimiter;

detecting, by a first process among the plurality of processes, a text region indicating one data value based on a detection result of predetermined format code from the text data in the plurality of divided files;

determining, by a second process simultaneously executed with timing at which the first process is executed among the plurality of processes, that the at least one candidate that is not included in the text region is a record separation point; and transmitting a plurality of partial texts corresponding to the pieces of record data to one or more processes that transforms the plurality of partial text into a record format data, each of the plurality of partial texts being extracted from the plurality of divided files based on the determined record separation point, wherein the second process includes:

identifying a first delimiter position of a record located across a plurality of blocks allocated to the plurality of processes by using the pattern of the state which indicates an inside of a range of an enclosing character related to a part of the text region;

identifying a second delimiter position of a record located across the plurality of blocks by using the pattern of the state which indicates an outside of a range of the enclosing character; and when a specific state of the enclosing characters specified by the first process indicates an outside of a range of the enclosing character, identifying, among the first delimiter position and the second delimiter position, the second delimiter position as a delimiter position corresponding to the specific state of the enclosing characters.

2. The non-transitory computer-readable storage medium according to claim 1, wherein the detecting includes:

detecting, for each of the plurality of divided files, the predetermined format code in the text data;

determining, for each of the plurality of divided files, the text region based on the result of detecting the predetermined format code for each of a case where the predetermined format code is active at a top portion of the text data and a case where the predetermined format code is inactive at the top portion of the text data; and determining, for each of the plurality of divided files, whether the predetermined format code is active or inactive based on a result of the determining of the text region for prior divided file corresponding to prior part of the text file; and confirming, for each of the plurality of divided files, the text region based on a result of the determining whether the predetermined format code is active or inactive.

3. The non-transitory computer-readable storage medium according to claim 1, wherein
a data size of each of the plurality of divided files is smaller than a size of a file cache memory of the computer on which the plurality of processes are executed.

4. The non-transitory computer-readable storage medium according to claim 1, wherein
the candidate for a record separation point is a line feed code; and wherein
the predetermined format code is an enclosing character that denotes that the line feed code is to be handled as part of data in the text data.

5. The non-transitory computer-readable storage medium according to claim 1, wherein
the predetermined format code is a double quote; and wherein
the delimiter is a comma for separation.

6. The non-transitory computer-readable storage medium according to claim 1, wherein
the identifying the at least one candidate is executed by the plurality of processes in parallel.

7. A record data processing method executed by a computer, the record data processing method comprising:
identifying, by a plurality of processes, at least one candidate for a record separation point from text data in each of a plurality of divided files, the plurality of divided files being generated by dividing a text file corresponding to pieces of record data delimited by a delimiter;
detecting, by a first process among the plurality of processes, a text region indicating one data value based on a detection result of predetermined format code from the text data in the plurality of divided files;
determining, by a second process simultaneously executed with timing at which the first process is executed among the plurality of processes, that the at least one candidate that is not included in the text region is a record separation point; and
transmitting a plurality of partial texts corresponding to the pieces of record data to one or more processes that transforms the plurality of partial text into a record format data, each of the plurality of partial texts being extracted from the plurality of divided files based on the determined record separation point,
wherein the second process includes:
identifying a first delimiter position of a record located across a plurality of blocks allocated to the plurality of processes by using the pattern of the state which indicates an inside of a range of an enclosing character related to a part of the text region;
identifying a second delimiter position of a record located across the plurality of blocks by using the pattern of the state which indicates an outside of a range of the enclosing character; and
when a specific state of the enclosing characters specified by the first process indicates an outside of a range of the enclosing character, identifying, among the first delimiter position and the second delimiter position, the second delimiter position as a delimiter position corresponding to the specific state of the enclosing characters.

8. A record data processing apparatus comprising:
a memory; and
a processor coupled to the memory and the processor configured to execute a processing, the processing including:
identifying, by a plurality of processes, at least one candidate for a record separation point from text data in each of a plurality of divided files, the plurality of divided files being generated by dividing a text file corresponding to pieces of record data delimited by a delimiter;
detecting, by a first process among the plurality of processes, a text region indicating one data value based on a detection result of predetermined format code from the text data in the plurality of divided files;
determining, by a second process simultaneously executed with timing at which the first process is executed among the plurality of processes, that the at least one candidate that is not included in the text region is a record separation point; and
transmitting a plurality of partial texts corresponding to the pieces of record data to one or more processes that transforms the plurality of partial text into a record format data, each of the plurality of partial texts being extracted from the plurality of divided files based on the determined record separation point,
wherein the second process includes:
identifying a first delimiter position of a record located across a plurality of blocks allocated to the plurality of processes by using the pattern of the state which indicates an inside of a range of an enclosing character related to a part of the text region;
identifying a second delimiter position of a record located across the plurality of blocks by using the pattern of the state which indicates an outside of a range of the enclosing character; and
when a specific state of the enclosing characters specified by the first process indicates an outside of a range of the enclosing character, identifying, among the first delimiter position and the second delimiter position, the second delimiter position as a delimiter position corresponding to the specific state of the enclosing characters.

* * * * *